US008438566B2

(12) United States Patent
Logan et al.

(10) Patent No.: US 8,438,566 B2
(45) Date of Patent: *May 7, 2013

(54) MANAGING ASSIGNMENT OF PARTITION SERVICES TO VIRTUAL INPUT/OUTPUT ADAPTERS

(75) Inventors: Bryan M. Logan, Rochester, MN (US); Kyle A. Lucke, Oronoco, MN (US); Amartey S. Pearson, Austin, TX (US); Steven E. Royer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,393

(22) Filed: Apr. 16, 2012

(65) Prior Publication Data

US 2012/0204174 A1    Aug. 9, 2012

Related U.S. Application Data

(63) Continuation of application No. 12/403,416, filed on Mar. 13, 2009, now Pat. No. 8,281,306.

(60) Provisional application No. 61/059,492, filed on Jun. 6, 2008.

(51) Int. Cl.
*G06F 9/455* (2006.01)
*G06F 9/46* (2006.01)

(52) U.S. Cl.
USPC ............................................. 718/1; 718/105

(58) Field of Classification Search ........................ None
See application file for complete search history.

(56) References Cited

U.S. PATENT DOCUMENTS

| 5,909,540 | A | 6/1999 | Carter et al. |
| RE36,462 | E | 12/1999 | Chang et al. |
| 6,725,284 | B2 | 4/2004 | Arndt |
| 6,769,017 | B1 | 7/2004 | Bhat et al. |
| 6,976,137 | B2 | 12/2005 | Ouren et al. |
| 7,080,146 | B2 * | 7/2006 | Bradford et al. ............. 709/226 |
| 7,234,139 | B1 * | 6/2007 | Feinberg ......................... 718/1 |
| 7,305,592 | B2 | 12/2007 | Neiger et al. |

(Continued)

OTHER PUBLICATIONS

IBM International Technical Support Organization, "HiperSockets Implementation Guide", pp. 1-132 (Mar. 2007).

(Continued)

*Primary Examiner* — Eddie P Chan
*Assistant Examiner* — William B Partridge
(74) *Attorney, Agent, or Firm* — Heslin Rothenberg Farley & Mesiti, P.C.

(57) ABSTRACT

Automated management of partition service assignment to a virtual input/output (VIO) adapter is provided. Responsive to creation of a new partition service in a data processing system, a partition priority number is determined for the new partition service, and, for each VIO adapter, the partition priority numbers of the partition services currently assigned to that VIO adapter are summed. For a VIO adapter with a lowest sum of partition priority numbers, logic determines whether assigning the new partition service to that VIO adapter results in its summed partition priority number being above a predefined threshold, and the new partition service is assigned to a VIO adapter based, at least in part, on whether assigning the new partition service to the VIO adapter with the lowest sum of partition priority numbers results in that VIO adapter's summed partition priority number exceeding the predefined threshold.

14 Claims, 10 Drawing Sheets

U.S. PATENT DOCUMENTS

| | | |
|---|---|---|
| 7,337,296 B2 | 2/2008 | Noel et al. |
| 7,506,095 B2 | 3/2009 | Otte et al. |
| 7,680,754 B2 | 3/2010 | Hillier |
| 7,698,531 B2 | 4/2010 | Flemming et al. |
| 7,702,843 B1 | 4/2010 | Chen et al. |
| 7,849,347 B2 | 12/2010 | Armstrong et al. |
| 8,046,641 B2 | 10/2011 | Hernandez et al. |
| 2002/0010844 A1 | 1/2002 | Noel et al. |
| 2002/0016812 A1 | 2/2002 | Uchishiba et al. |
| 2002/0087611 A1 | 7/2002 | Tanaka et al. |
| 2002/0138704 A1 | 9/2002 | Hiser et al. |
| 2003/0084372 A1 | 5/2003 | Mock et al. |
| 2004/0139287 A1 | 7/2004 | Foster et al. |
| 2004/0193861 A1 | 9/2004 | Michaelis |
| 2004/0199599 A1 | 10/2004 | Nichols et al. |
| 2005/0071446 A1 | 3/2005 | Graham et al. |
| 2005/0132249 A1 | 6/2005 | Burton et al. |
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1 | 5/2006 | Shah et al. |
| 2006/0123217 A1 | 6/2006 | Burdick et al. |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0071755 A1 | 3/2008 | Barsness et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2008/0270674 A1 | 10/2008 | Ginzton et al. |
| 2009/0100237 A1 | 4/2009 | Orikasa et al. |
| 2009/0144510 A1 | 6/2009 | Wibling et al. |
| 2009/0307436 A1 | 12/2009 | Larson et al. |
| 2009/0307438 A1 | 12/2009 | Logan et al. |
| 2009/0307439 A1 | 12/2009 | Jacobs et al. |
| 2009/0307440 A1 | 12/2009 | Jacobs et al. |
| 2009/0307441 A1 | 12/2009 | Hepkin et al. |
| 2009/0307447 A1 | 12/2009 | Jacobs et al. |
| 2009/0307538 A1 | 12/2009 | Hernandez et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

OTHER PUBLICATIONS

Kloster, Jacob Faber et al. "Efficient Memory Sharing in the Xen Virtual Machine Monitor", Department of Computer Science, Aalborg University (Jan. 2006).

Valdez, E. et al., "Retrofitting the IBM POWER Hypervisor to Support Mandatory Access Control", 23rd Annual Computer Security Applications Conference (pp. 221-230) (2007) (No further date information is available.).

Waldspurger, Carl A., "Memory Resource Management in VMware ESX Server." ACM, OSDI '02, (Dec. 2002).

Anderson et al., Office Action for U.S. Appl. No. 12/403,402, filed Mar. 13, 2009 (U.S. Patent Publication No. 2009/0307713 A1) dated Nov. 30, 2011.

Larson et al., Office Action for U.S. Appl. No. 12/403,408, filed Mar. 13, 2009 (US Patent Publication No. 2009/0307436 A1) dated Jul. 15, 2011.

Larson et al., Notice of Allowance for U.S. Appl. No. 12/403,408, filed Mar. 13, 2009 (US Patent Publication No. 2009/0307436 A1) dated Dec. 19, 2011.

Logan et al., Office Action for U.S. Appl. No. 12/403,426, filed Mar. 13, 2009 (US Patent Publication No. 2009/0307438 A1) dated May 26, 2011.

Logan et al., Notice of Allowance for U.S. Appl. No. 12/403,426, filed Mar. 13, 2009 (US Patent Publication No. 2009/0307438 A1) dated Nov. 7, 2011.

Jacobs et al., Office Action for U.S. Appl. No. 12/403,440, filed Mar. 13, 2009 (US Patent Publication No. 2009/0307439 A1) dated Oct. 27, 2011.

Jacobs et al., Office Action for U.S. Appl. No. 12/403,447, filed Mar. 13, 2009 (US Patent Publication No. 2009/0307440 A1) dated May 5, 2011.

Jacobs et al., Notice of Allowance for U.S. Appl. No. 12/403,447, filed Mar. 13, 2009 (US Patent Publication No. 2009/0307440 A1) dated Oct. 18, 2011.

Hepkin et al., Office Action for U.S. Appl. No. 12/403,472, filed Mar. 13, 2009 (US Patent Publication No. 2009/0307441 A1) dated Sep. 22, 2011.

Hepkin et al., Notice of Allowance for U.S. Appl. No. 12/403,472, filed Mar. 13, 2009 (US Patent Publication No. 2009/0307441 A1) dated Jan. 27, 2012.

Jacobs et al., Office Action for U.S. Appl. No. 12/403,485, filed Mar. 13, 2009 (US Patent Publication No. 2009/0307447 A1) dated Apr. 28, 2011.

Jacobs et al., Final Office Action for U.S. Appl. No. 12/403,485, filed Mar. 13, 2009 (US Patent Publication No. 2009/0307447 A1) dated Oct. 7, 2011.

Jacobs et al., Notice of Allowance for U.S. Appl. No. 12/403,485, filed Mar. 13, 2009 (US Patent Publication No. 2009/0307447 A1) dated Dec. 30, 2011.

Hernandez et al., Office Action for US Letters Patent No. 8,046,641 B2, issued Oct. 25, 2011, dated Jan. 19, 2011.

Jacobs et al., Office Action for U.S. Appl. No. 12/403,459, filed Mar. 13, 2009 (US Patent Publication No. 2009/0307445 A1), dated Mar. 7, 2012.

Logan et al., Office Action for U.S. Appl. No. 13/369,575, filed Feb. 9, 2012, dated Mar. 12, 2012.

Jacobs et al., Office Action for U.S. Appl. No. 13/344,721, filed Jan. 6, 2012, dated Mar. 20, 2012.

Jacobs et al., Office Action for U.S. Appl. No. 13/344,708, filed Jan. 6, 2012, dated Mar. 27, 2012.

Logan et al., Office Action for U.S. Appl. No. 12/403,416, filed Mar. 13, 2009 (US Patent Publication No. 2009/0307690 A1), dated Mar. 30, 2012.

Jacobs et al., Final Office Action for U.S. Appl. No. 12/403,440, filed Mar. 13, 2009 (US Patent Publication No. 2009/0307439 A1) dated Apr. 6, 2012.

Larson et al., Office Action for U.S. Appl. No. 13/362,402, filed Jan. 31, 2012, dated Apr. 11, 2012.

* cited by examiner

MANAGING ASSIGNMENT OF PARTITION SERVICES TO VIRTUAL INPUT/OUTPUT ADAPTERS

CROSS-REFERENCE TO RELATED APPLICATIONS

This application is a continuation of U.S. patent application Ser. No. 12/403,416, filed Mar. 13, 2009, entitled "Managing Assignment of Partition Services to Virtual Input/Output Adapters", which was published on Dec. 10, 2009, as U.S. Patent Publication No. 2009/0307690 A1, and which claims the benefit of U.S. provisional application Ser. No. 61/059,492, filed Jun. 6, 2008, entitled "Virtual Real Memory", the entirety of each of which is hereby incorporated herein by reference.

TECHNICAL FIELD

The present invention relates generally to data processing systems, and more particularly, to managing assignment of partition services to virtual input/output (VIO) adapters in a logically partitioned data processing system, such as a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS) partition, which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient.

SUMMARY OF THE INVENTION

Provided herein, in one aspect, is a computer-implemented method of managing assignment of partition services to virtual input/output (VIO) adapters in a data processing system comprising multiple partitions. The method includes: responsive to creation of a new partition service associated with a logical partition of the data processing system, determining a partition priority number for the partition service; summing, for each VIO adapter of at least one VIO adapter of the data processing system, partition priority numbers of partition services currently assigned to that VIO adapter; automatically determining, for a VIO adapter with a lowest sum of partition priority numbers, whether assigning the new partition service to that VIO adapter will move its sum of partition priority numbers above a predefined threshold; and automatically assigning the new partition service to a VIO adapter of the data processing system based, at least in part, on whether assigning the new partition service to that VIO adapter with the lowest sum of partition priority numbers will move its summed partition priority number above the predefined threshold.

In a further aspect, a computer-implemented method is provided for managing assignment of a partition service to a virtual input/output (VIO) adapter in a data processing system comprising multiple logical partitions. This method includes: responsive to creation of a new partition service associated with a logical partition of the data processing system, determining a maximum number of partition services the new partition service can share a VIO adapter with; determining, for each VIO adapter of at least one VIO adapter of the data processing system, a partition service with a lowest maximum number to share with from all partition services currently assigned to that VIO adapter; and automatically assigning the partition service to the least-utilized VIO adapter of the data processing system if adding the partition service to the least-utilized VIO adapter will not over-commit that VIO adapter by raising the number of partition services assigned thereto above its lowest maximum number to share with for the partition services currently assigned to that VIO adapter and for the new partition service.

In another aspect, a data processing system is provided which includes at least one processor comprising multiple logical partitions. The multiple logical partitions require multiple partition services. Further, the at least one processor includes a virtual input/output server (VIOS) partition comprising at least one virtual input/output (VIO) adapter, the at least one VIO adapter interfacing the VIOS partition to a hypervisor of the data processing system. The VIOS partition manages assignment of a partition service to a particular VIO adapter by: determining a partition priority number for the new partition service; summing, for each VIO adapter of the at least one VIO adapter, partition priority numbers of partition services currently assigned to that VIO adapter; automatically determining for a VIO adapter with a lowest sum of partition priority numbers, whether assigning the new partition service to that VIO adapter will move its sum of partition priority numbers above a predefined threshold; and automatically assigning the new partition service to a VIO adapter of the data processing system based, at least in part, on whether assigning the new partition service to the VIO adapter with the lowest sum of partition priority numbers will move that VIO adapter's summed partition priority number above the predefined threshold.

In a further aspect, an article of manufacture is provided, which includes at least one computer-readable medium having computer-readable program code logic to manage assignment of a partition service to a virtual input/output (VIO) adapter in a data processing system having multiple logical partitions. The computer-readable program code logic when executing on a processor performing: responsive to creation of a new partition service associated with a logical partition of the data processing system, determining a partition priority number for the partition service; summing, for each VIO adapter of at least one VIO adapter of the data processing system, partition priority numbers of partition services currently assigned to that VIO adapter; automatically determining, for a VIO adapter with a lowest sum of partition priority numbers, whether assigning the new partition service to that VIO adapter will move its sum of partition priority numbers above a predefined threshold; and automatically assigning the new partition service to a VIO adapter of the data processing system based, at least in part, on whether assigning the new partition service to that VIO adapter with the lowest sum of partition priority numbers will move that VIO adapter's summed partition priority number above the predefined threshold.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
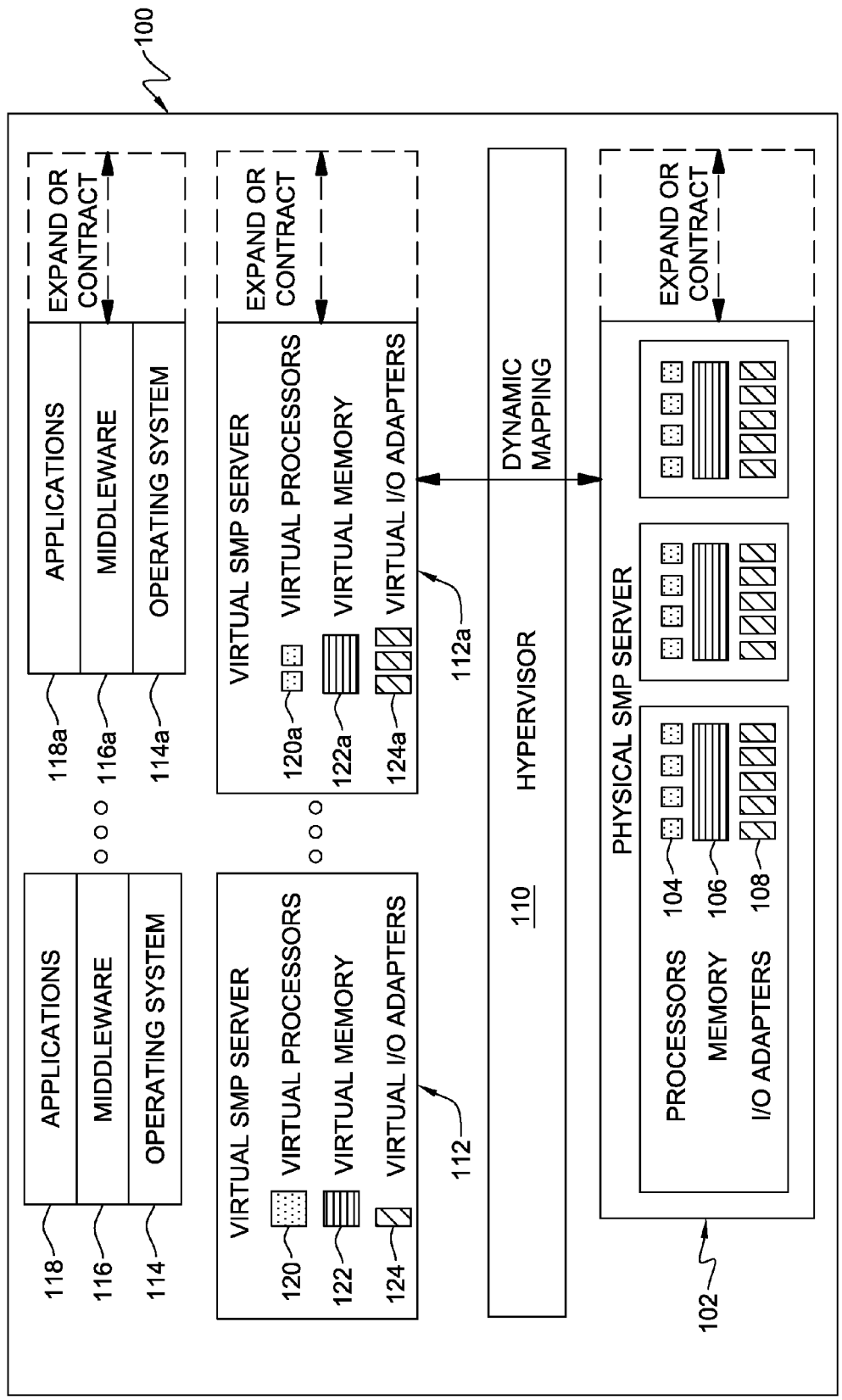
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and input/output (I,O) adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
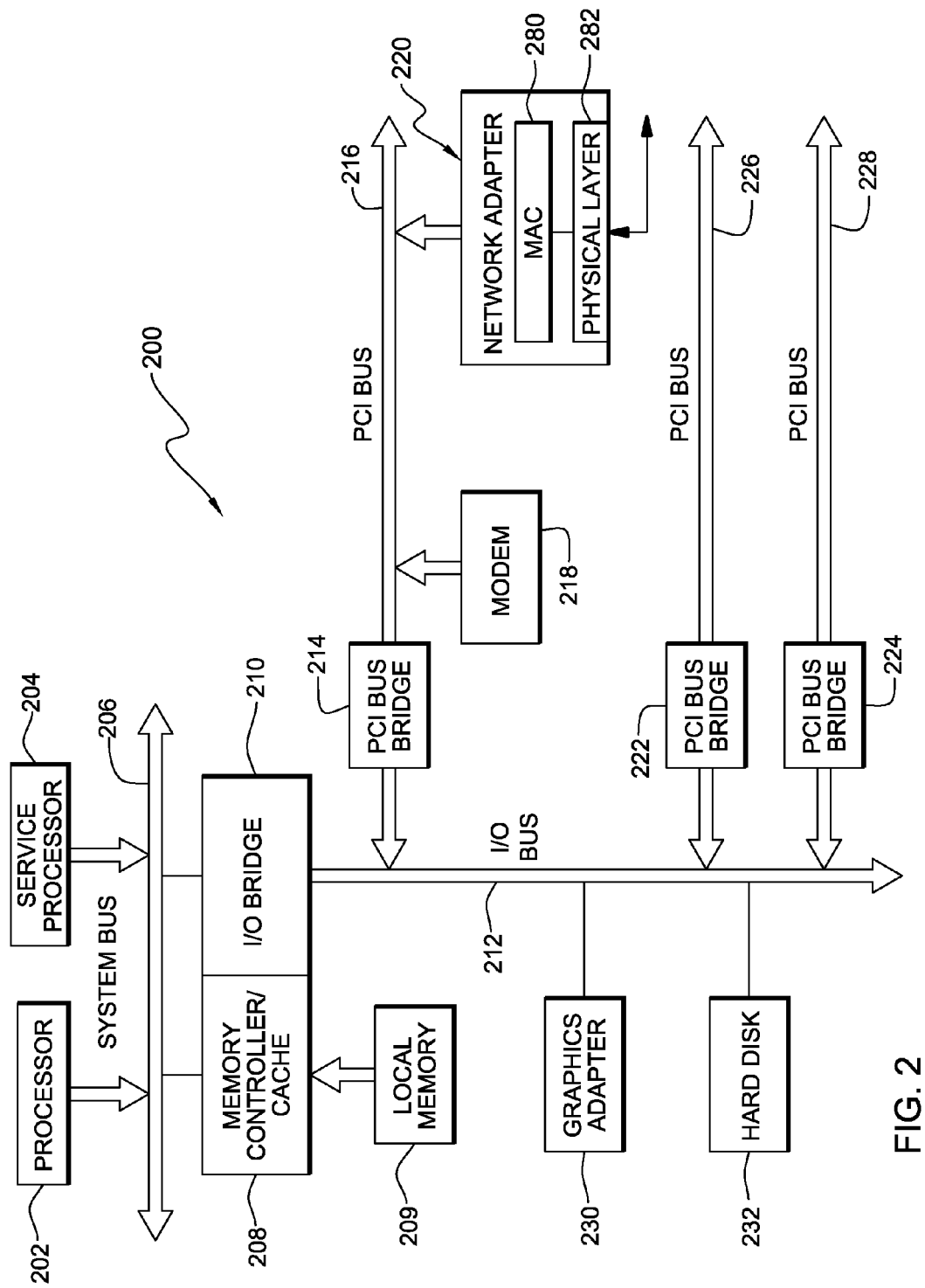
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described herein below can be built upon technologies found in IBM's p/i Series product line firmware and systemware, as described in the "Power Architecture Platform Reference" (PAPR) material Version 2.7, 09 Oct. 2007, which is hereby incorporated herein by reference. In addition, a virtual input/output server (VIOS) is commercially available as part of a PowerVM™ computing system offered by International Business Machines Corporation™. The VIOS allows sharing of physical resources between logical partitions, including virtual small computer system interface (SCSI) and virtual networking. This allows more efficient utilization of physical resources through sharing between logical partitions and facilitates server consolidation.

Figure 3:
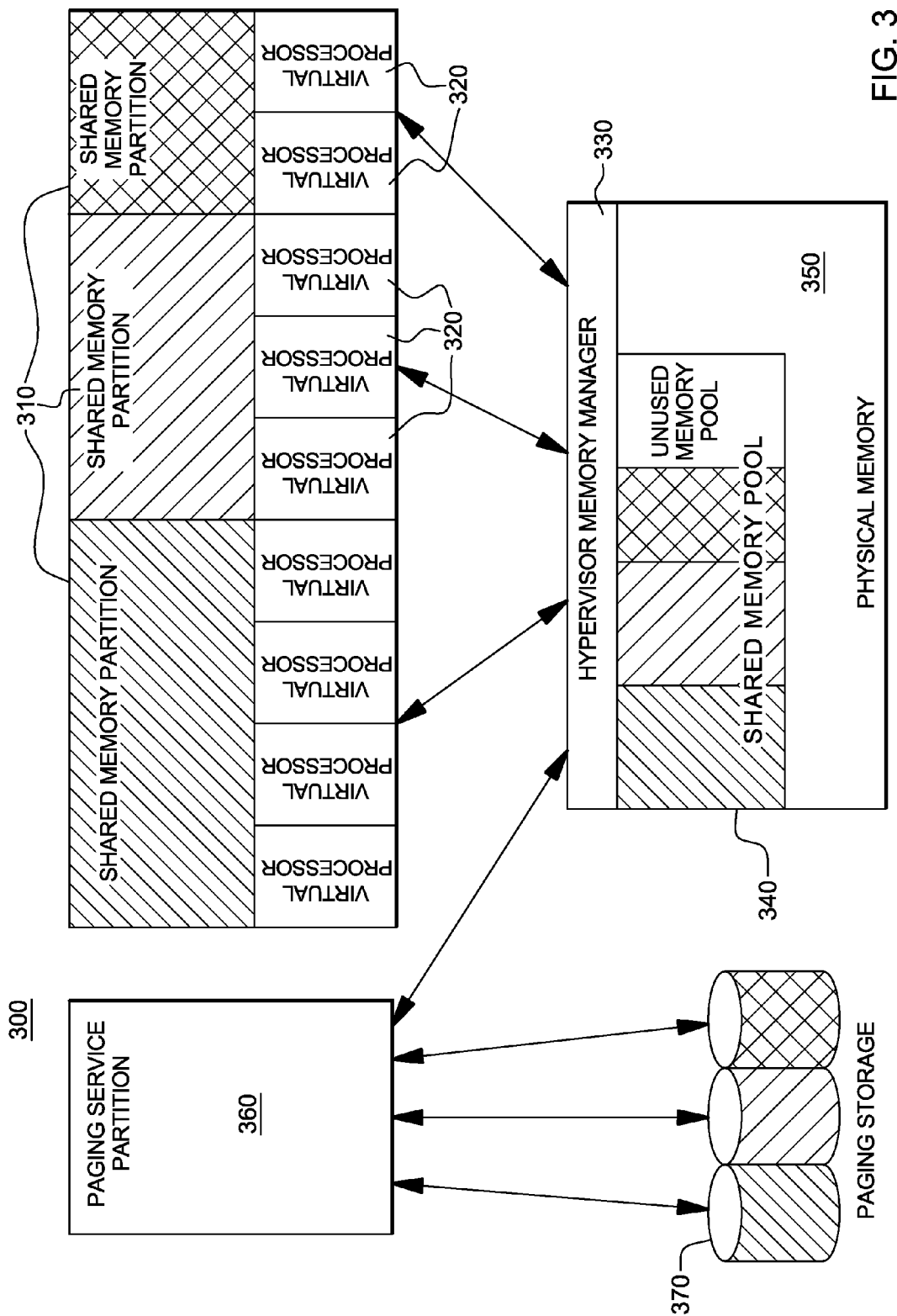
FIG. 3 illustrates one embodiment of a data processing system comprising multiple shared memory partitions employing a dynamically adjusting shared (or common) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory partitions 310, each of which comprises one or more virtual processors 320, which interface through a hypervisor, and more particularly, a hypervisor memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive storage (such as disk storage), via a paging service partition 360. Paging service partition 360 is an enhanced virtual input/output service (VIOS) partition configured to facilitate page-out and page-in of memory pages from or to, respectively, the shared memory pool.

Also, although referred to as a shared memory pool, in reality, there is no sharing of memory per se, but rather a sharing of the availability of a defined amount of physical memory in the pool. This shared memory pool is alternatively characterized as active memory, or virtual real memory. The amount or volume of memory within shared memory pool 340 may be dynamically allocated or adjusted between the shared memory partitions into sub-volumes or sets of physical pages to accommodate workloads. These dynamically allocated adjusted sub-volumes or sets of physical pages in the shared memory pool are associated with the multiple logical partitions and may comprise contiguous or disparate physical memory locations within the shared memory pool. A physical memory page of the shared memory pool becomes part of a sub-volume of a particular logical partition when a logical memory page thereof is associated with or mapped to that physical page. Also, although referred to as a shared memory pool, in reality, there is no concurrent sharing of access to a physical page per se, but rather a sharing of the defined amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output (VIO) adapter connections to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by a shared memory partition and it does not have a physical mapping in the shared memory pool, the hypervisor treats this request to access as an internal fault (i.e., hypervisor page fault). In response to a hypervisor page fault for a logical memory page that is not resident in the shared memory pool, an input/output (I/O) paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of that processor until the I/O paging request is satisfied, or if the hypervisor page fault occurred while external interrupts were enabled for the virtual processor, until an external or timer interrupt occurs. The I/O paging request is submitted to the VIO adapter of the paging service partition, which communicates with the paging service partition in order to retrieve and return the correct contents of the logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
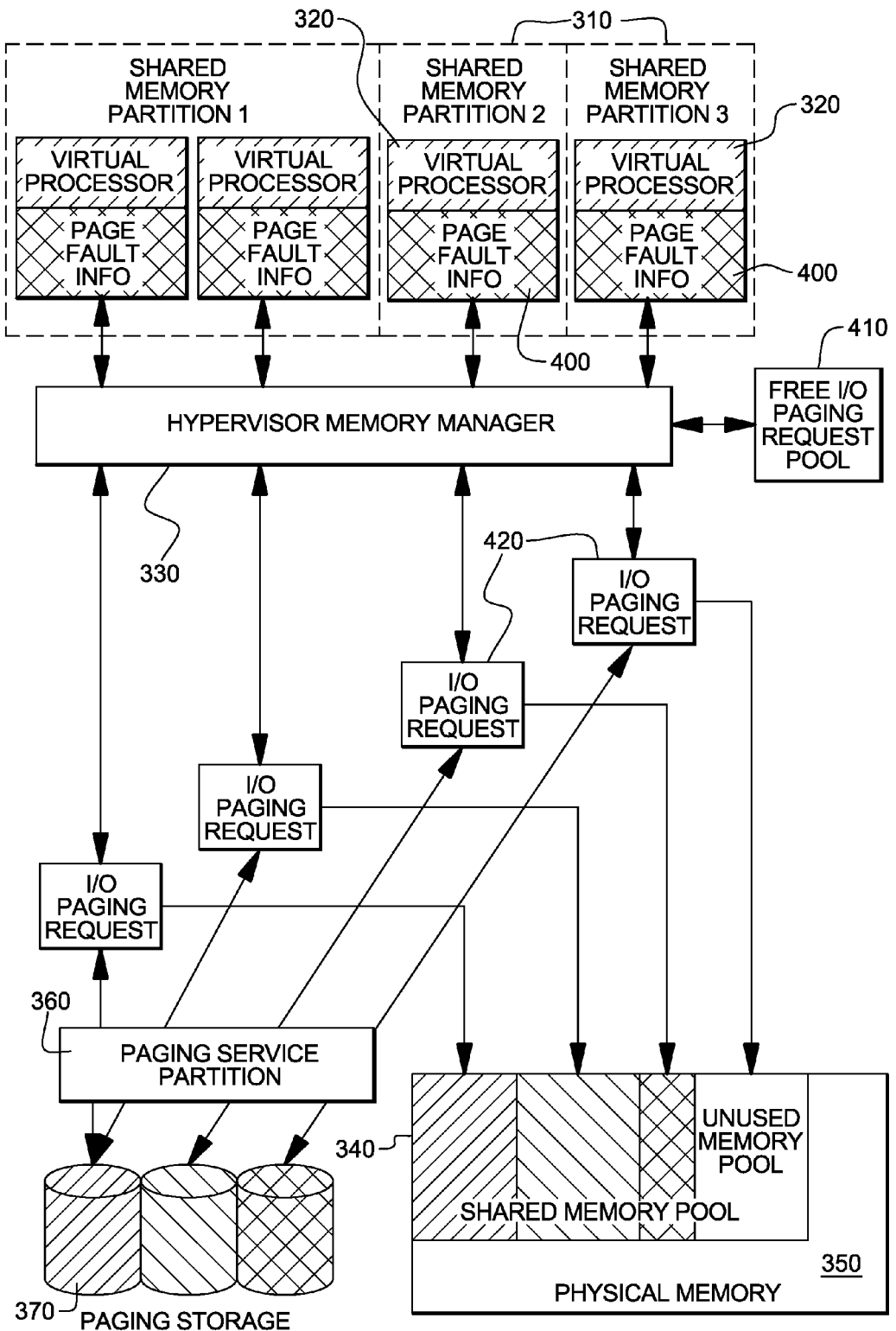
FIG. 4 illustrates one embodiment for handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state.

Figure 5:
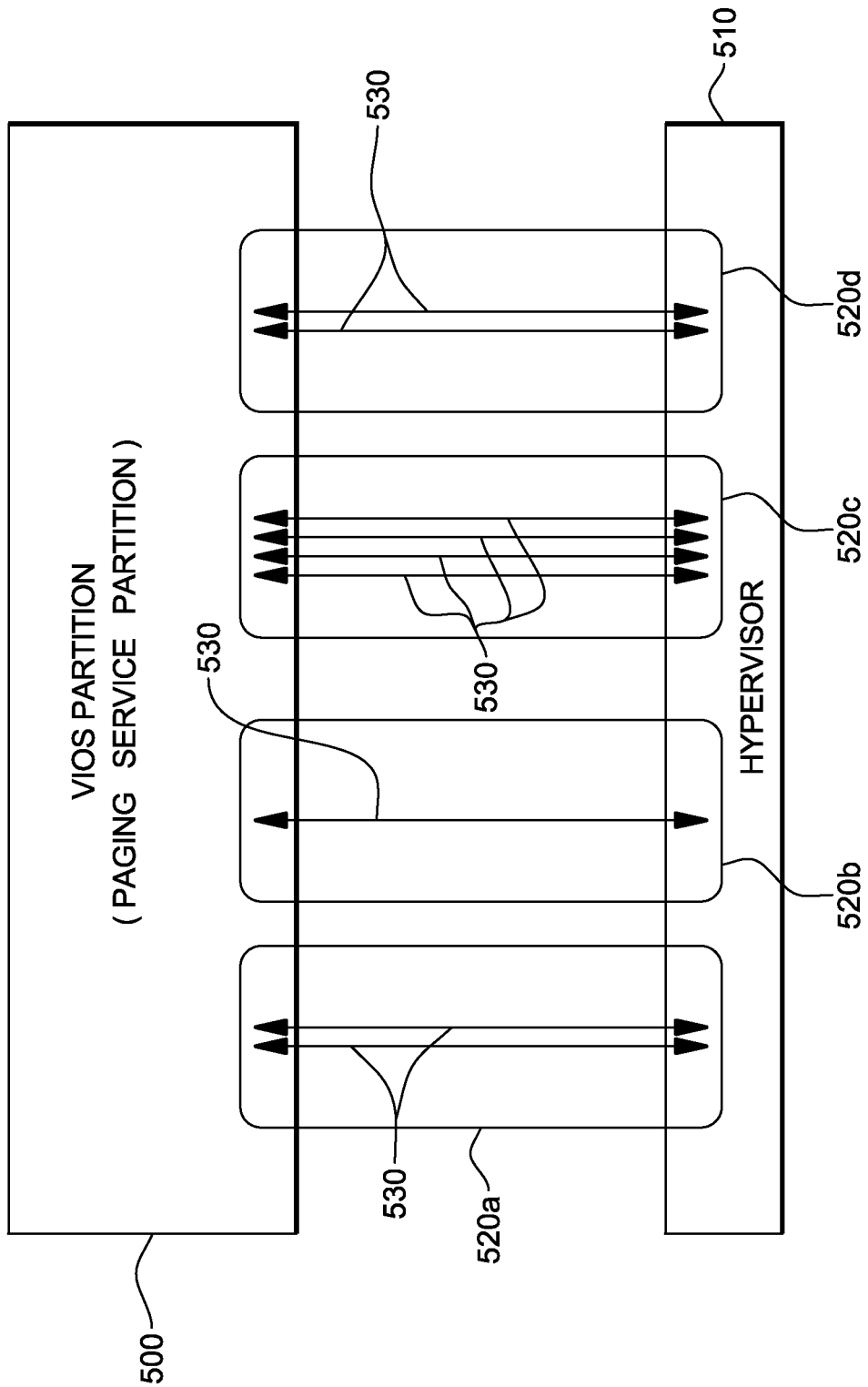
FIG. 5 illustrates one embodiment of a communications interface between a virtual input/output server (VIOS) partition of a logically partitioned data processing system and a hypervisor thereof, wherein multiple virtual input/output (VIO) adapters are shown accommodating the partition services, in accordance with an aspect of the present invention.

For certain virtualization features, such as handling the above-described hypervisor page fault, the hypervisor may need to communicate with a partition, such as a paging service partition, or more generally, a virtual input/output server (VIOS) partition so that the VIOS can provide services on behalf of the hypervisor. As illustrated in FIG. 5, this communication is accomplished employing one or more virtual input/output adapters 520a, 520b, 520c & 520d interfacing VIOS partition 500 and hypervisor 510 of the logically partitioned data processing system. In the above-described shared memory partition data processing system, the VIOS partition is a paging service partition. However, the partition service assignment and reassignment logic presented herein is applicable to any logically partitioned data processing system wherein one or more partition services are offloaded to a designated logical service partition, such as a virtual input/output server (VIOS) partition. In FIG. 5, four virtual input/output adapters 520a, 520b, 520c and 520d are illustrated by way of example only. Depending on the implementation, there may be a single virtual input/output adapter for a partition service type or multiple virtual input/output adapters for a common partition service type. In this example, each arrow 530 represents a partition service associated with a particular logical partition of the logically partitioned data processing system. As shown, VIO adapter 520a accommodates two partition services 530 for two logical partitions of the data processing system, VIO adapter 520b accommodates one partition service 530, VIO adapter 520c accommodates four partition services, and VIO adapter 520d accommodates two partition services 530, again by way of example only.

In the above-described hypervisor-managed paging environment, the hypervisor utilizes a VIOS partition (i.e., the paging service partition) to provide virtual memory paging to other partitions. In such a case, when a logical memory area of a logical partition is paged-out from physical memory to external storage, the hypervisor sends a notice to the paging service partition (i.e., the VIOS partition) through the virtual input/output adapter to which the partition service has been assigned. If many shared memory partitions exist on the data processing system, it is beneficial to have multiple virtual input/output adapters interfacing the service partition and hypervisor so that the paging service partition can take multiple interrupts on different processors. However, balancing load of the virtual input/output adapters can affect performance of the logical partitions. For example, if a simple round-robin approach is performed, then a user does not have a mechanism to single out one or more logical partitions to be able to perform at an enhanced level compared with other logical partitions. The invention described herein addresses this issue.

Figure 6:
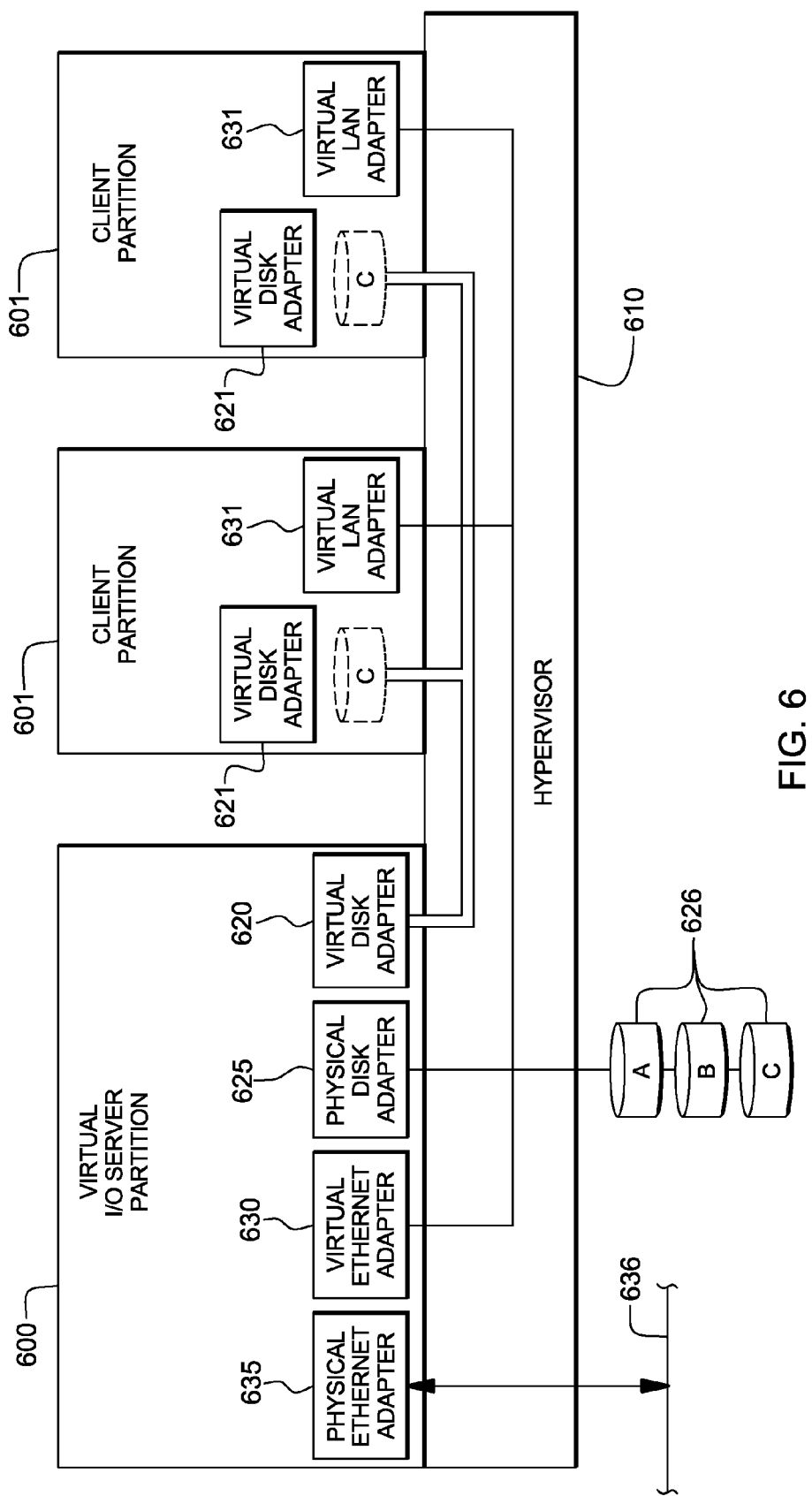
FIG. 6 illustrates another embodiment of a communications interface between a VIOS partition, client logical partitions and a hypervisor of a data processing system, illustrating virtual input/output (VIO) adapters within the VIOS accommodating partition services associated with the client logical partitions, in accordance with an aspect of the present invention.

FIG. 6 depicts another embodiment of a logically partitioned data processing system comprising a service partition, such as a virtual input/output server (VIOS) partition 600, and multiple client logical partitions 601. The client logical partitions 601 interface to VIOS partition 600 through a hypervisor 610, which comprises, for example, virtual small computer system interface (SCSI) or virtual networking capabilities, such as provided with the IBM PowerVM™ computing system. As illustrated, each client partition 601 includes a virtual disk adapter 621 and a virtual local area network (LAN) adapter 631, which are shown interfacing with a virtual disk adapter 620 and virtual Ethernet adapter 630 within VIOS partition 600. Although each client logical partition 601 sees a portion of physical storage disk C as accessible, the direct physical access to the physical storage disk 626 is controlled through VIOS partition 600 via a physical disk adapter 625. Similarly, access to the physical network 636 is via (in one example) a physical Ethernet adapter 635 belonging to VIOS partition 600. In this manner, communications with the physical storage disk or the external network are controlled by VIOS partition 600.

Disclosed herein, in one aspect, is an approach for managing assignment of partition services to virtual input/output (VIO) adapters in a data processing system comprising multiple logical partitions, for example, such as the above-described shared memory data processing system. In one implementation, the virtual input/output adapters to be managed are associated with a service partition, such as the virtual input/output server partition of the data processing system described above in connection with FIGS. 5 & 6. In one approach, priorities are assigned to logical partitions, or to their associated partition services, that are then used to automatically determine the number of virtual input/output adapters to be employed by a VIOS partition (or more generally, any service partition) in providing services to the hypervisor, as well as placement of the partition services on those virtual input/output adapters. This is accomplished (in one embodiment) by having a system user or administrator choose a priority level for each logical partition, and thus by extension, for any new partition service associated with a logical partition. This partition priority number is then employed by logic within the service partition, e.g., the virtual input/output server partition, in automatically assigning distributing partition services to the virtual input/output adapters interfacing the service partition and hypervisor of the system.

Figure 7:
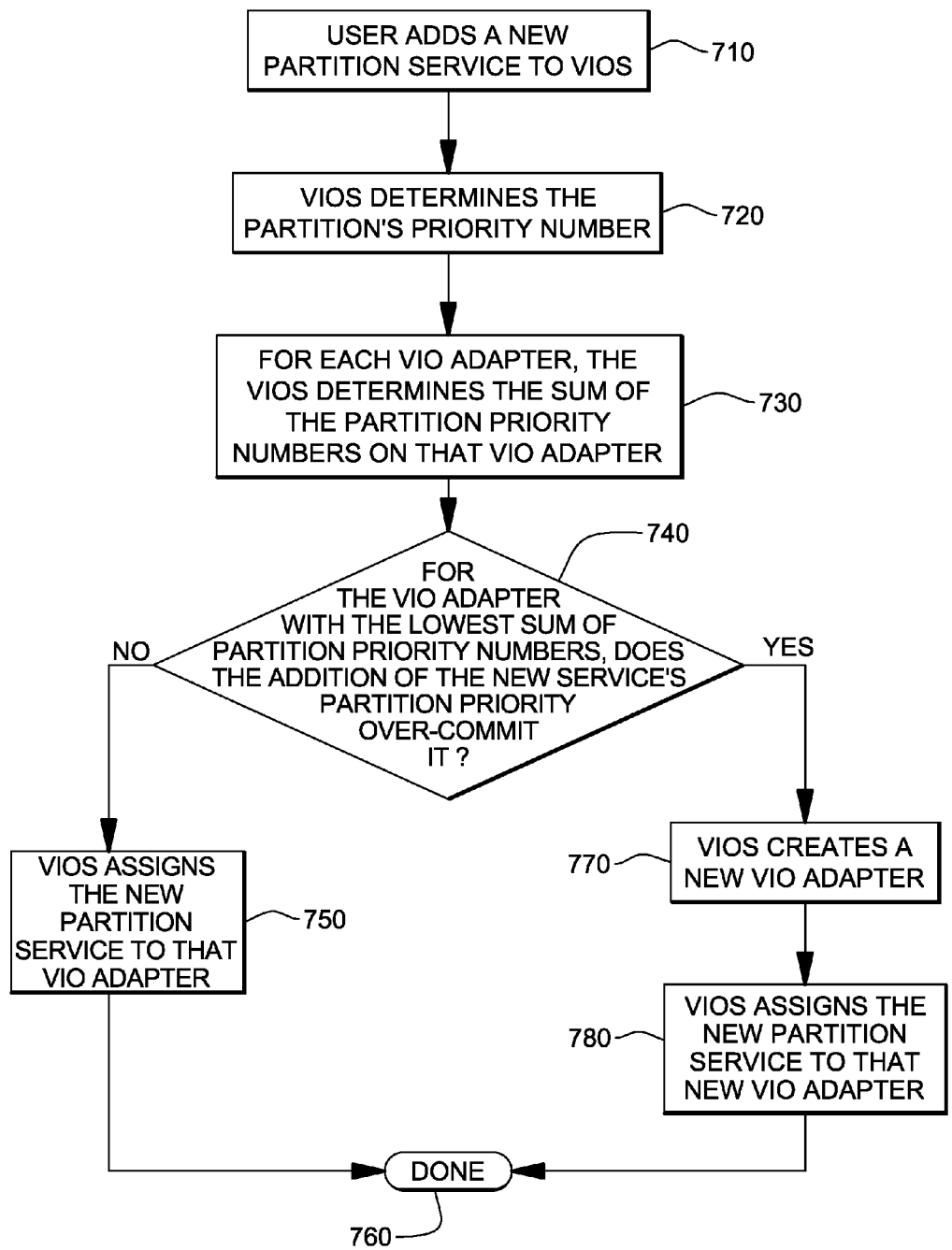
FIG. 7 depicts one embodiment of logic for assigning a new partition service to a virtual input/output (VIO) adapter of a partition in a logically partitioned data processing system, in accordance with an aspect of the present invention.

FIG. 7 illustrates one embodiment of logic for assigning a new partition service to a virtual input/output adapter of, for example, a VIOS partition of a logically partitioned data processing system, such as the logically partitioned data processing system illustrated above in connection with FIGS. 1-4. As illustrated in FIG. 7, a user or system administrator initiates the addition of a new partition service to the VIOS partition 710, for example, by creating a new logical partition within the data processing system. The VIOS partition determines the partition priority number for the new partition service 720. This partition priority number may be user or system administrator assigned, either directly or indirectly (e.g., by assignment of a partition priority number to the newly created logical partition). That is, a partition priority number may be assigned to the logical partition by the system administrator creating the logical partition, which may then be associated with each partition service to be accommodated for the newly created logical partition. The partition priority number can be solely used for virtual input/output adapter assignment, or it could be tied into other aspects of the data processing system, such as a shared memory pool weighting factor, a paging priority, or a processor recovery priority. Thus, whenever a shared memory partition (or more generally, a logical partition) is created, its priority level is checked.

Existing virtual input/output (VIO) adapter allocations are then examined to determine whether there is room in a virtual input/output adapter for the new partition service, or if a new virtual input/output adapter should be created. If no existing virtual input/output adapter is located, then a new virtual input/output adapter is created to accommodate the new partition service. As illustrated in FIG. 7, one approach to assigning the new partition service to a virtual input/output adapter is to determine for each existing VIO adapter of the VIOS partition the sum of the partition priority numbers of the partition services already assigned to that VIO adapter 730. The VIOS partition then determines, for the VIO adapter with the lowest sum of partition priority numbers, whether assigning the new partition service to that VIO adapter will move its summed partition priority number above a predefined threshold, that is, result in over-committing the virtual input/output adapter 740. If "no", then the VIOS partition assigns the partition service to the VIO adapter having the lowest sum of partition priority numbers 750, which completes partition service assignment 760. If, however, the addition of the new partition service's partition priority number to the summed partition priority number of the VIO adapter with the lowest sum of partition priority numbers moves its summed partition priority number above the predefined threshold, then the VIOS partition establishes a new VIO adapter 770 and assigns the new partition service to that new VIO adapter 780, which completes partition service assignment 760.

Figure 8:
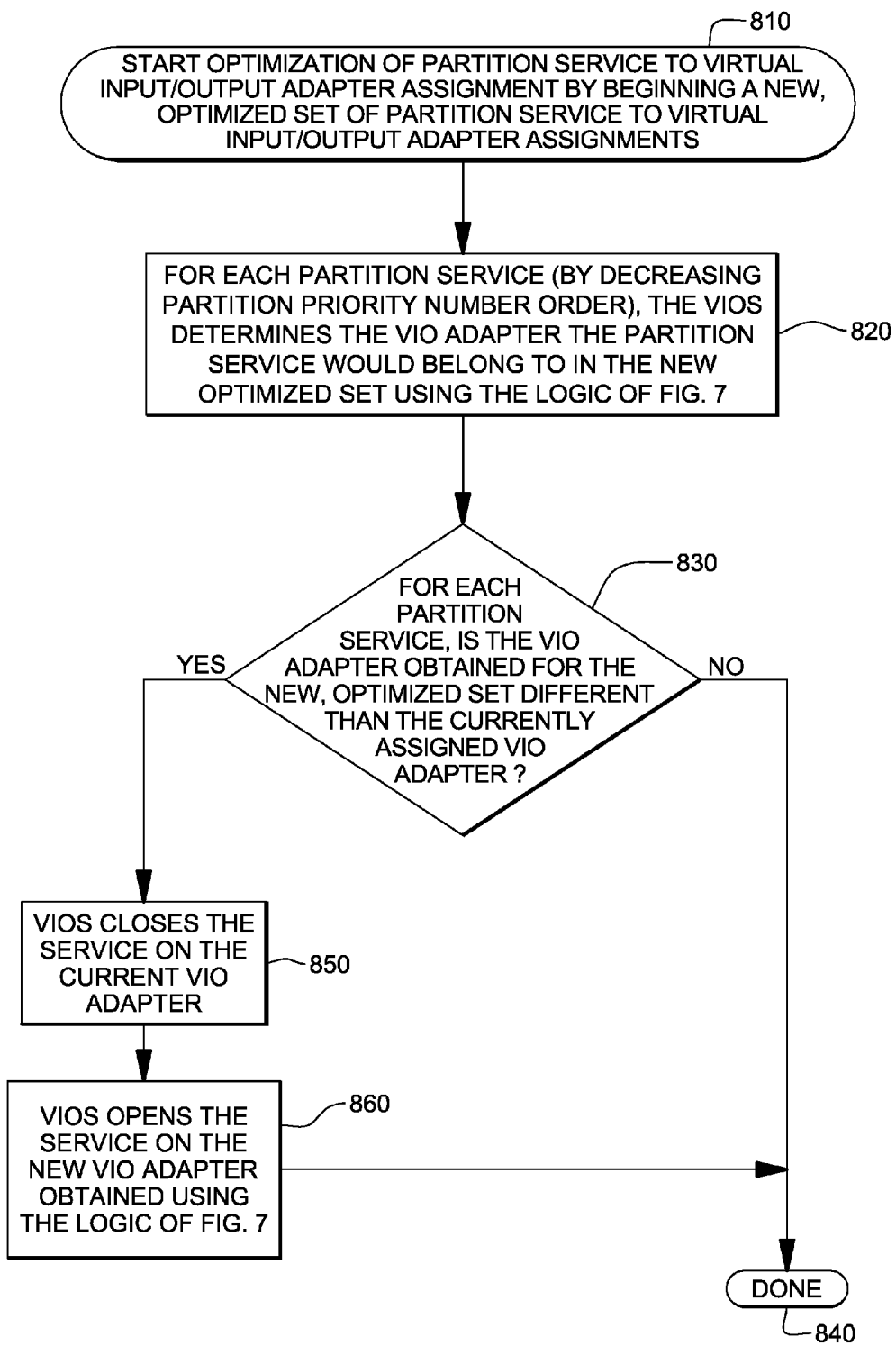
FIG. 8 depicts one embodiment of logic for optimizing assignment of partition services to VIO adapters of a partition in a logically partitioned data processing system, in accordance with an aspect of the present invention.

FIG. 8 depicts one embodiment of logic for reassigning partition services between virtual input/output adapters of a VIOS partition within a logically partitioned data processing system. The optimization logic begins with creating a new, optimized set of partition services to virtual input/output (VIO) adapter(s) assignments 810. The VIOS determines, for each partition service accommodated by the VIOS, in a decreasing partition priority number order, the VIO adapter it would belong to in the new, optimized set using the logic of FIG. 7 820. The VIOS partition then determines whether the VIO adapter obtained for the new, optimized set using the logic of FIG. 7 is different from the VIO adapter to which the partition service is currently assigned 830. If "no", then processing for this service partition is complete 840. Otherwise, the VIOS closes the partition service on its current VIO adapter 850 and opens the partition service on the different VIO adapter obtained using the logic of FIG. 7 860. After each partition service has been considered in decreasing partition priority number order, processing is complete 840.

If a predefined hard limit is reached in the number of virtual input/output adapters supported by the VIOS partition, then the hypervisor may either choose to reject the creation of a new logical partition, or warn the user or system administrator that the virtual input/output adapters are being over-allocated, and increase the limit of the cumulative priority in order to accommodate the newly created logical partition, and its partition service(s). Also, if the VIOS partition has the above-described ability to dynamically move assigned partition services between virtual input/output adapters, "defragmentation" may be accomplished to ensure that the highest priority partitions are on the virtual input/output adapters which have the least number of partitions, or alternatively, the lowest cumulative partition priority number.

Tables 1-8 depict one example of assigning, and then reassigning partition services to VIO adapters. In the example of Table 1, it is assumed that there are four VIO adapters supported by the VIOS partition (i.e., VIO adapter 1, VIO adapter 2, VIO adapter 3 and VIO adapter 4), and that the virtual input/output adapters are limited to a sum of 100, that is, the predefined threshold is 100.

TABLE 1

| VIO Adapter | Logical Partition | Partition Priority |
| --- | --- | --- |
| 1 | 2 | 50 |
| 1 | 3 | 30 |
| 2 | 4 | 65 |
| 2 | 5 | 20 |
| 3 | 6 | 90 |
| 4 | 7 | 20 |
| 4 | 8 | 30 |
| 4 | 9 | 15 |

If a new logical partition, logical partition 10, with a priority 25 is to be added (as illustrated in Table 2), then the sums of the partition priority numbers for the currently assigned virtual input/output adapters are determined as: VIO Adapter 1=80, VIO Adapter 2=85, VIO Adapter 3=90, and VIO Adapter 4=65.

TABLE 2

| VIO Adapter | Logical Partition | Partition Priority |
| --- | --- | --- |
| 1 | 2 | 50 |
| 1 | 3 | 30 |

TABLE 2-continued

| VIO Adapter | Logical Partition | Partition Priority |
|---|---|---|
| 2 | 4 | 65 |
| 2 | 5 | 20 |
| 3 | 6 | 90 |
| 4 | 7 | 20 |
| 4 | 8 | 30 |
| 4 | 9 | 15 |
| 4 | 10 | 25 |

Since VIO Adapter 4 has the smallest sum of partition priority numbers, and since adding a partition priority number of 25 to this sum would not exceed the predefined threshold of 100, then logical partition 10 is added onto VIO Adapter 4. This is the result even through VIO Adapter 3 is serving only one logical partition, since that logical partition has a higher priority than the other logical partitions.

Employing the logic of FIG. 8, optimization of the group of VIO adapters in Table 2 may be performed by starting a new, optimized set of partition services to adapter assignments. As shown in Table 3, the first four placements in decreasing priority number order (i.e., of the partition services for logical partitions 6, 4, 2 & 3) are straightforward based on partition priority, since they all end of up with empty virtual input/output adapters.

TABLE 3

| VIO Adapter | Logical Partition | Partition Priority |
|---|---|---|
| 3 | 2 | 50 |
| 4 | 3 | 30 |
| 2 | 4 | 65 |
|   | 5 | 20 |
| 1 | 6 | 90 |
|   | 7 | 20 |
|   | 8 | 30 |
|   | 9 | 15 |
|   | 10 | 25 |

As shown in Table 4, once logical partition 8 is reached, the priority sums are evaluated and logical partition 8 is placed in with logical partition 3 on virtual input/output adapter 4.

TABLE 4

| VIO Adapter | Logical Partition | Partition Priority |
|---|---|---|
| 3 | 2 | 50 |
| 4 | 3 | 30 |
| 2 | 4 | 65 |
|   | 5 | 20 |
| 1 | 6 | 90 |
|   | 7 | 20 |
| 4 | 8 | 30 |
|   | 9 | 15 |
|   | 10 | 25 |

At logical partition 10, the logical partition priority number is evaluated and placed on virtual input/output adapter 3, which has a sum of 50, with virtual input/output adapter 4 having a sum of 60. This is illustrated in Table 5.

TABLE 5

| VIO Adapter | Logical Partition | Partition Priority |
|---|---|---|
| 3 | 2 | 50 |
| 4 | 3 | 30 |
| 2 | 4 | 65 |
|   | 5 | 20 |
| 1 | 6 | 90 |
|   | 7 | 20 |
| 4 | 8 | 30 |
|   | 9 | 15 |
| 3 | 10 | 25 |

At logical partition 5, its partition service is assigned to virtual input/output adapter 4, which has a sum of 60, with virtual input/output adapter 2 having a sum of 65. This is illustrated in Table 6.

TABLE 6

| VIO Adapter | Logical Partition | Partition Priority |
|---|---|---|
| 3 | 2 | 50 |
| 4 | 3 | 30 |
| 2 | 4 | 65 |
| 4 | 5 | 20 |
| 1 | 6 | 90 |
|   | 7 | 20 |
| 4 | 8 | 30 |
|   | 9 | 15 |
| 3 | 10 | 25 |

In Table 7, at logical partition 7, the evaluation process results in logical partition 7 being assigned to virtual input/output adapter 2, which has a sum of 65.

TABLE 7

| VIO Adapter | Logical Partition | Partition Priority |
|---|---|---|
| 3 | 2 | 50 |
| 4 | 3 | 30 |
| 2 | 4 | 65 |
| 4 | 5 | 20 |
| 1 | 6 | 90 |
| 2 | 7 | 20 |
| 4 | 8 | 30 |
|   | 9 | 15 |
| 3 | 10 | 25 |

As shown in Table 8, at logical partition 9, the evaluation process results in the partition service for that logical partition being assigned to virtual input/output adapter 3, which has a sum of 75.

TABLE 8

| VIO Adapter | Logical Partition | Partition Priority |
|---|---|---|
| 3 | 2 | 50 |
| 4 | 3 | 30 |
| 2 | 4 | 65 |
| 4 | 5 | 20 |
| 1 | 6 | 90 |
| 2 | 7 | 20 |
| 4 | 8 | 30 |
| 3 | 9 | 15 |
| 3 | 10 | 25 |

This completes the optimization process employing the protocol of FIG. 8 for the example provided.

Figure 9:
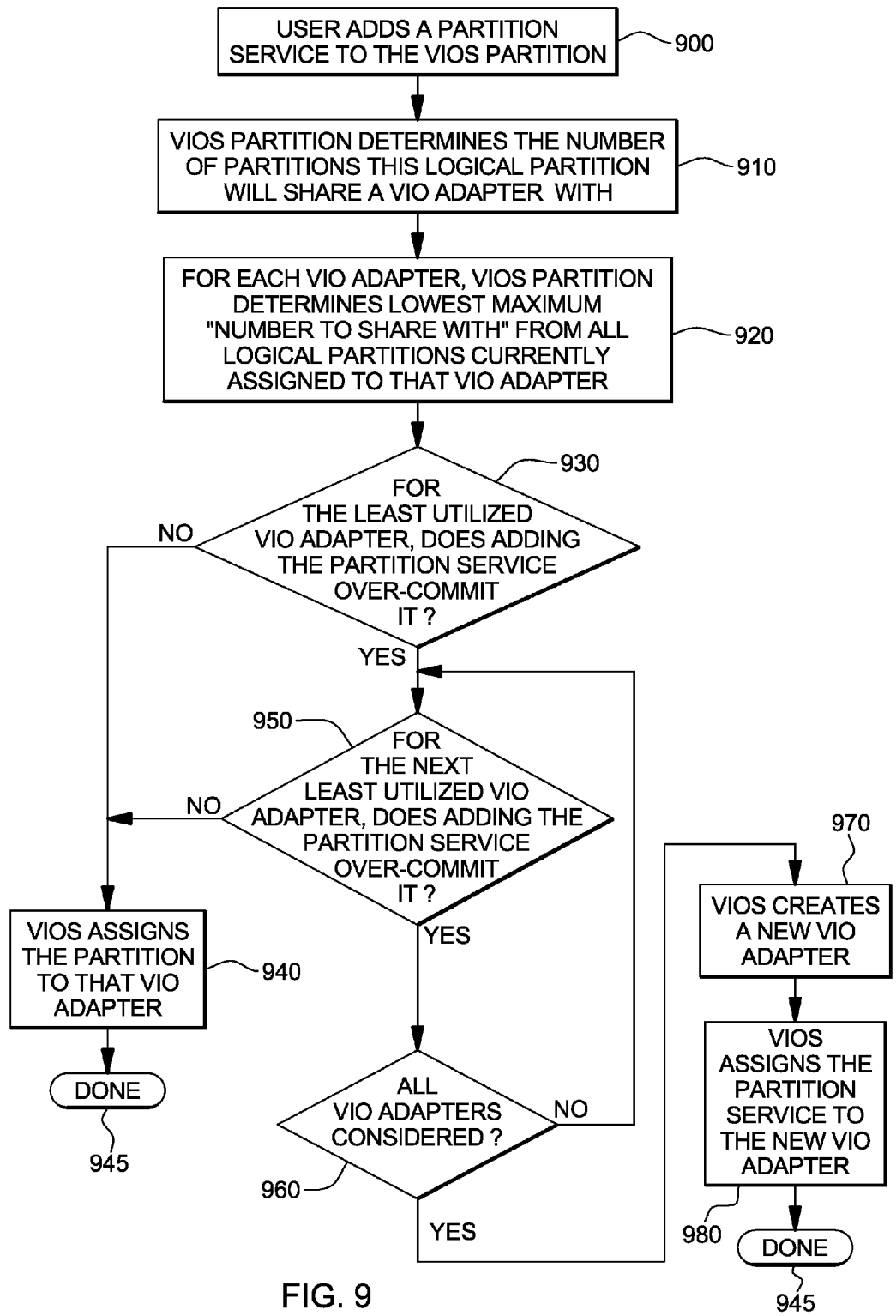
FIG. 9 depicts another embodiment of logic for assigning a new partition service to a VIO adapter of a partition in a logically partitioned data processing system, in accordance with an aspect of the present invention.

FIG. 9 illustrates an alternate embodiment of logic for assigning a new partition service to a virtual input/output adapter employing a count of the number of logical partitions supported by each VIO adapter, and a maximum number of logical partitions (or LPARs) that each logical partition is willing to share at its virtual input/output adapter with. A user (or system administrator) initiates the addition of a new partition service to the VIOS partition 900, for example, by creating a new logical partition within the data processing system illustrated above in connections with FIGS. 1-4. The VIOS partition determines the maximum number of partitions this new logical partition will share a VIO adapter with 910. This maximum number of partitions the logical partition is willing to share a VIO adapter with may be user or system administrator assigned, either directly to the partition service or indirectly (e.g., by assignment of a partition number to the newly created logical partition indicative of the maximum number of partitions the logical partition is willing to share a VIO adapter with). Thus, whenever a logical partition is created, its partition number indicative of the maximum number of logical partitions it is willing to share a VIO adapter with is obtained.

For each VIO adapter, the VIOS partition determines a partition service currently assigned thereto having a lowest maximum "number to share with" from all partition services currently assigned to that VIO adapter 920. The VIOS partition then determines for the least-utilized VIO adapter whether adding the new partition service to that VIO adapter will result in the partition service over-committing the VIO adapter 930 by raising the number of partition services assigned thereto above its lowest maximum number to shared with for the partition services currently assigned to that VIO adapter or for the new partition service. If "no", then the VIOS partition assigns the new partition service to the VIO adapter having the least number of partition services assigned to it 940, which completes partition service assignment 945.

If assigning the partition to the VIO adapter which has the smallest number of partition services currently assigned to it results in the VIO adapter being over-committed, then the VIOS partition determines for the next, least-utilized VIO adapter whether adding the new partition service to that VIO adapter will over-commit it 950. If "no", then the VIOS partition assigns the partition service to that VIO adapter. Otherwise, the VIOS partition determines whether all VIO adapters have been considered 960. If "no", then the VIOS partition repeats the process for the next, least-utilized VIO adapter. Once all VIO adapters have been considered without assignment of the new partition service to one of those VIO adapters, then the VIOS partition creates a new VIO adapter 970 and assigns the new partition service to that VIO adapter 980, which completes partition service assignment 945.

Further details on shared memory partition data processing systems are provided in the following, co-filed applications/patents, the entirety of each of which is hereby incorporated herein by reference: U.S. Pat. No. 8,230,077 B2, issued Jul. 24, 2012, entitled "Hypervisor-Based Facility for Communicating Between a Hardware Management Console and a Logical Partition"; U.S. Pat. No. 8,166,234 B2, issued Apr. 24, 2012, entitled "Hypervisor Page Fault Processing in a Shared Memory Partition Data Processing System"; U.S. Pat. No. 8,135,921 B2 issued Mar. 13, 2012, entitled "Automated Paging Device Management in a Shared Memory Partition Data Processing System"U.S. Patent Publication No. 2009/0307438 A1, published Dec. 10, 2009, entitled "Dynamic Control of Partition Memory Affinity in a Shared Memory Partition Data Processing System"; U.S. Pat. No. 8,127,086 B2, issued Feb. 28, 2002, entitled "Transparent Hypervisor Pinning of Critical Memory Areas in a Shared Memory Partition Data Processing System"; U.S. Patent Publication No. 2009/0307445 A1, published Dec. 10, 2009, entitled "Shared Memory Partition Data Processing System with Hypervisor Managed Paging"; U.S. Pat. No. 8,195,867 B2, issued Jun. 5, 2012, entitled "Controlled Shut-Down of Partitions Within a Shared Memory Partition Data Processing System"; and U.S. Pat. No. 8,171,236 B2, issued May 1, 2012, entitled "Managing Migration of a Shared Memory Logical Partition From a Source System to a Target System".

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 10:
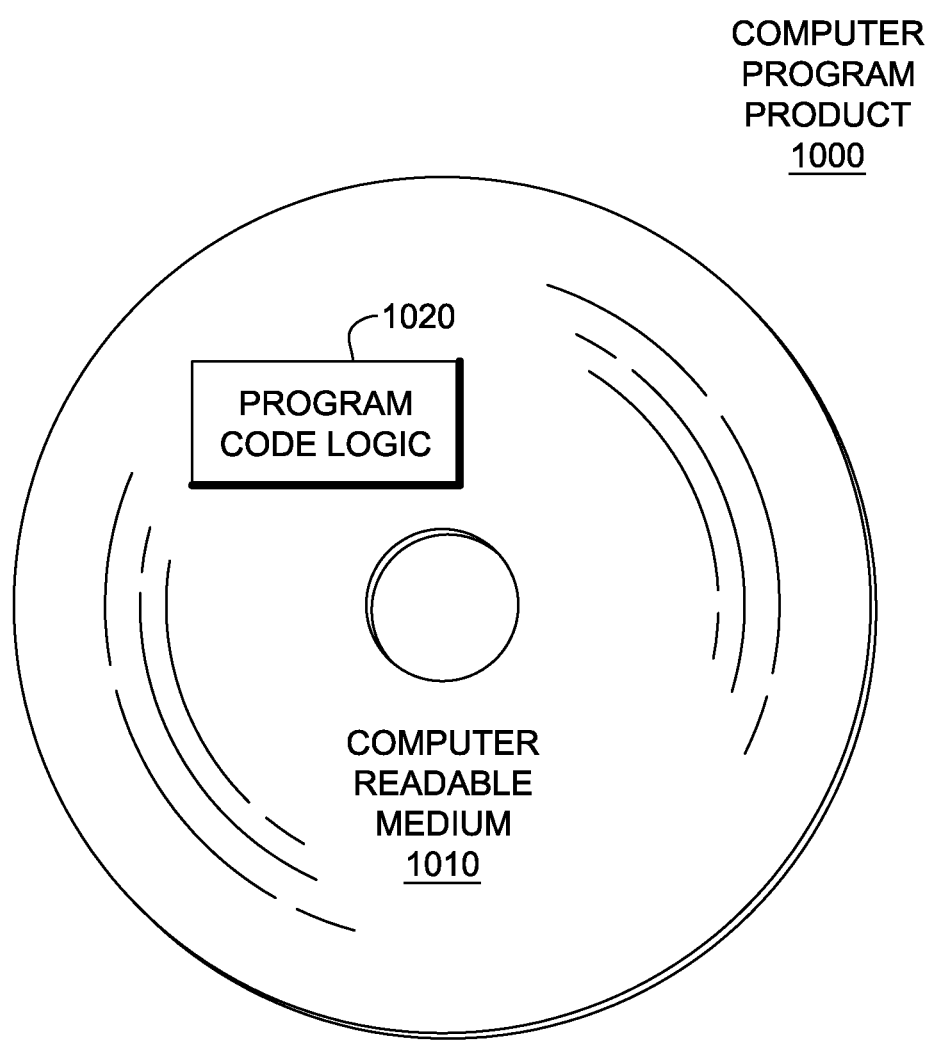
FIG. 10 depicts one embodiment of a computer program product incorporating one or more aspects of the present invention.

One example of an article of manufacture or a computer program product incorporating one or more aspects of the present invention is described with reference to FIG. 10. A computer program product 1000 includes, for instance, one or more computer usable media 1010 to store computer readable program code means or logic 1020 thereon to provide and facilitate one or more aspects of the present invention. The medium can be an electronic, magnetic, optical, electromagnetic, infrared, or semiconductor system for apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and digital versatile disc (DVD).

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, direct access storage devices (DASD), tape, compact discs (CDs), DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data processing system comprising:
    at least one processor comprising multiple logical partitions, the multiple logical partitions requiring multiple partition services; and
    wherein the at least one processor further comprises a virtual input/output server (VIOS) partition comprising at least one virtual input/output (VIO) adapter, the at least one VIO adapter interfacing the VIOS partition to a hypervisor of the data processing system, and wherein the VIOS partition manages assignment of a partition service to a particular VIO adapter by:
        determining a partition priority number for the new partition service;
        summing, for each VIO adapter of the at least one VIO adapter, partition priority numbers of partition services currently assigned to that VIO adapter;
        automatically determining, for a VIO adapter with a lowest sum of partition priority numbers, whether assigning the new partition service to that VIO adapter will move its sum of partition priority numbers above a predefined threshold; and
        automatically assigning the new partition service to a VIO adapter of the data processing system based, at least in part, on whether assigning the new partition service to the VIO adapter with the lowest sum of partition priority numbers will move that VIO adapter's summed partition priority number above the predefined threshold.

2. The data processing system of claim 1, wherein the partition priority number for the new partition service is a partition priority number assigned to a logical partition with which the new partition service is associated.

3. The data processing system of claim 1, wherein the automatically assigning comprises automatically assigning the new partition service to the VIO adapter of the at least one VIO adapter with the lowest sum of partition priority numbers if adding the new partition service's partition priority number to its sum of partition priority numbers results in a new sum of partition priority numbers which is less than the predefined threshold.

4. The data processing system of claim 3, wherein the automatically assigning comprises establishing a new VIO adapter and assigning the new partition service to the new VIO adapter if adding the partition service's partition priority number to the sum of the partition priority numbers for the VIO adapter with the lowest sum of partition priority numbers results in a new sum of partition priority numbers which is above a predefined threshold.

5. The data processing system of claim 1, wherein the VIOS partition manages assignment of the partition services to the at least one VIO adapter by optimizing assignment of partition services to the at least one VIO adapter, the optimizing comprising determining for each of at least some partition services, in a decreasing partition priority number order, whether the partition service should remain with its current VIO adapter of the at least one VIO adapter or be transitioned to a different VIO adapter, the determining repeating the summing, the automatically determining, and the automatically assigning for the partition service in a new, optimized set of partition services to VIO adapter(s) assignments, and responsive thereto, transitioning the partition service from the current VIO adapter to the different VIO adapter of the data processing system when the automatically determining and the automatically assigning results in the partition service being assigned from the current VIO adapter to the different VIO adapter in the new, optimized set of partition service to VIO adapter assignments, the transitioning comprising closing the partition service on the current VIO adapter and opening the partition service on the different VIO adapter.

6. The data processing system of claim 1, wherein the at least one VIO adapter interfaces a virtual input/output server partition and a hypervisor of the data processing system, and wherein the data processing system is a shared memory partition data processing system wherein the hypervisor transparently manages page-out and page-in of shared memory partition logical memory areas from a shared memory pool in physical memory of the data processing system to external paging storage employing, in part, the at least one VIO adapter and the virtual input/output server partition.

7. A computer program product for managing assignment of a partition service to a virtual input/output (VIO) adapter in a data processing system comprising multiple logical partitions, the computer program product comprising:
    a computer-readable non-transitory storage medium readable by a processor and storing instructions for execution by the processor for performing a method comprising:
        responsive to creation of a new partition service associated with a logical partition of the data processing system, determining a partition priority number for the new partition service;

summing, for each VIO adapter of at least one VIO adapter of the data processing system, partition priority numbers of partition services currently assigned to that VIO adapter;

automatically determining, for a VIO adapter with a lowest sum of partition priority numbers, whether assigning the new partition service to that VIO adapter will move its sum of partition priority numbers above a predefined threshold; and automatically assigning the new partition service to a VIO adapter of the data processing system based at least in part on whether assigning the new partition service to the VIO adapter with the lowest sum of partition priority numbers will move that VIO adapter's summed partition priority number above the predefined threshold.

8. The computer program product of claim 7, wherein the partition priority number for the new partition service is a partition priority number assigned to a logical partition with which the new partition service is associated.

9. The computer program product of claim 7, wherein the automatically assigning comprises automatically assigning the new partition service to the VIO adapter of the at least one VIO adapter with the lowest sum of partition priority numbers if adding the new partition service's partition priority number to its sum of partition priority numbers results in a new sum of partition priority numbers less than the predefined threshold.

10. The computer program product of claim 9, wherein the automatically assigning comprises establishing a new VIO adapter and assigning the new partition service to the new VIO adapter if adding the partition service's partition priority number to the sum of partition priority numbers for the VIO adapter with the lowest sum of partition priority numbers results in a new sum of partition priority numbers which is above the predefined threshold.

11. The computer program product of claim 7, further comprising optimizing assignment of partition services to the at least one VIO adapter by determining for each of at least some partition services, in a decreasing partition priority number order, whether the partition service should remain with its current VIO adapter of the at least one VIO adapter or be transitioned to a different VIO adapter, the determining repeating the summing, the automatically determining, and the automatically assigning, for the partition service, in a new, optimized set of partition services to VIO adapter(s) assignments, and responsive thereto, transitioning the partition service from the current VIO adapter to the different VIO adapter of the data processing system when the automatically determining and the automatically assigning results in the partition service being reassigned from the current VIO adapter to the different VIO adapter, the transitioning comprising closing the partition service on the current VIO adapter and opening the partition service on the different VIO adapter.

12. The computer program product of claim 7, wherein the at least one VIO adapter interfaces a virtual input/output server partition and a hypervisor of the data processing system, and wherein the data processing system is a shared memory partition data processing system wherein the hypervisor transparent manages page-out and page-in of shared memory partition logical memory areas from a shared memory pool in physical memory of the data processing system to external paging storage employing, in part, the at least one VIO adapter and the virtual input/output server partition.

13. A computer-implemented method of managing assignment of a partition service to a virtual input/output (VIO) adapter in a data processing system comprising multiple logical partitions, the method comprising:

responsive to creation of a new partition service associated with a logical partition of the data processing system, determining a maximum number of partition services the new partition service can share a VIO adapter with;

determining, for each VIO adapter of at least one VIO adapter of the data processing system, a partition service with a lowest maximum number to share with from all partition services currently assigned to that VIO adapter; and automatically assigning the partition service to the least-utilized VIO adapter of the data processing system if adding the partition service to the least-utilized VIO adapter will not over-commit that VIO adapter by raising the number of partition services assigned thereto above its lowest maximum number to share with for the partition services currently assigned to that VIO adapter and for the new partition service.

14. The method of claim 13, wherein if adding the new partition service to the least-utilized VIO adapter over-commits that VIO adapter, automatically determining for a next, least-utilized VIO adapter whether adding the new partition service to that VIO adapter will over-commit it by raising the number of partition services assigned thereto above its lowest maximum number to share with for the partition services currently assigned to that VIO adapter and for the new partition service, and if not, assigning the new partition service to that next, least-utilized VIO adapter, otherwise, repeating the process until each VIO adapter is considered, and if the new partition service cannot be added to any current VIO adapter, then establishing a new VIO adapter and assigning the new partition service to the new VIO adapter.

* * * * *